United States Patent
Mack et al.

[11] 3,856,124
[45] Dec. 24, 1974

[54] COUNTERWEIGHTED TORQUE TRANSMITTING MECHANISM

[75] Inventors: Raymond E. Mack, Rocky River; Kiritkumar R. Patel; Edward C. Crist, both of Brooklyn, all of N.Y.

[73] Assignee: Eaton Corporation, Cleveland, Ohio

[22] Filed: May 24, 1973

[21] Appl. No.: 363,686

[52] U.S. Cl....... 192/88 B, 192/103 F, 192/105 CF, 192/104 B, 192/106 F, 188/367
[51] Int. Cl............................................. F16d 25/04
[58] Field of Search.......... 192/88 B, 85 AT, 103 B, 192/103 F, 105 CF, 105 F, 104 B, 104 F, 105 R, 106 R, 106 F

[56] References Cited
UNITED STATES PATENTS

| | | | |
|---|---|---|---|
| 2,331,180 | 10/1943 | Gasser | 192/88 |
| 2,349,494 | 5/1944 | Fawick | 192/88 B |
| 2,428,933 | 10/1947 | Fawick | 192/88 X |
| 2,710,087 | 6/1955 | Picard | 192/88 |

*Primary Examiner*—Benjamin W. Wyche
*Attorney, Agent, or Firm*—Teagno & Toddy

[57] ABSTRACT

A counterweight arrangement is provided for a radially-engageable torque transmitting mechanism wherein inflation of a fluid-distensible diaphragm in a first member displaces a plurality of arcuate, segmented clutch shoe assemblies either radially-inwardly or radially-outwardly to frictionally engage a second member. The arrangement includes a pair of especially sized, pivoted counterweights for each shoe assembly which exert a mechanical force advantage thereto to oppose inherent, centrifugal forces of the torque transmitting mechanism.

10 Claims, 7 Drawing Figures

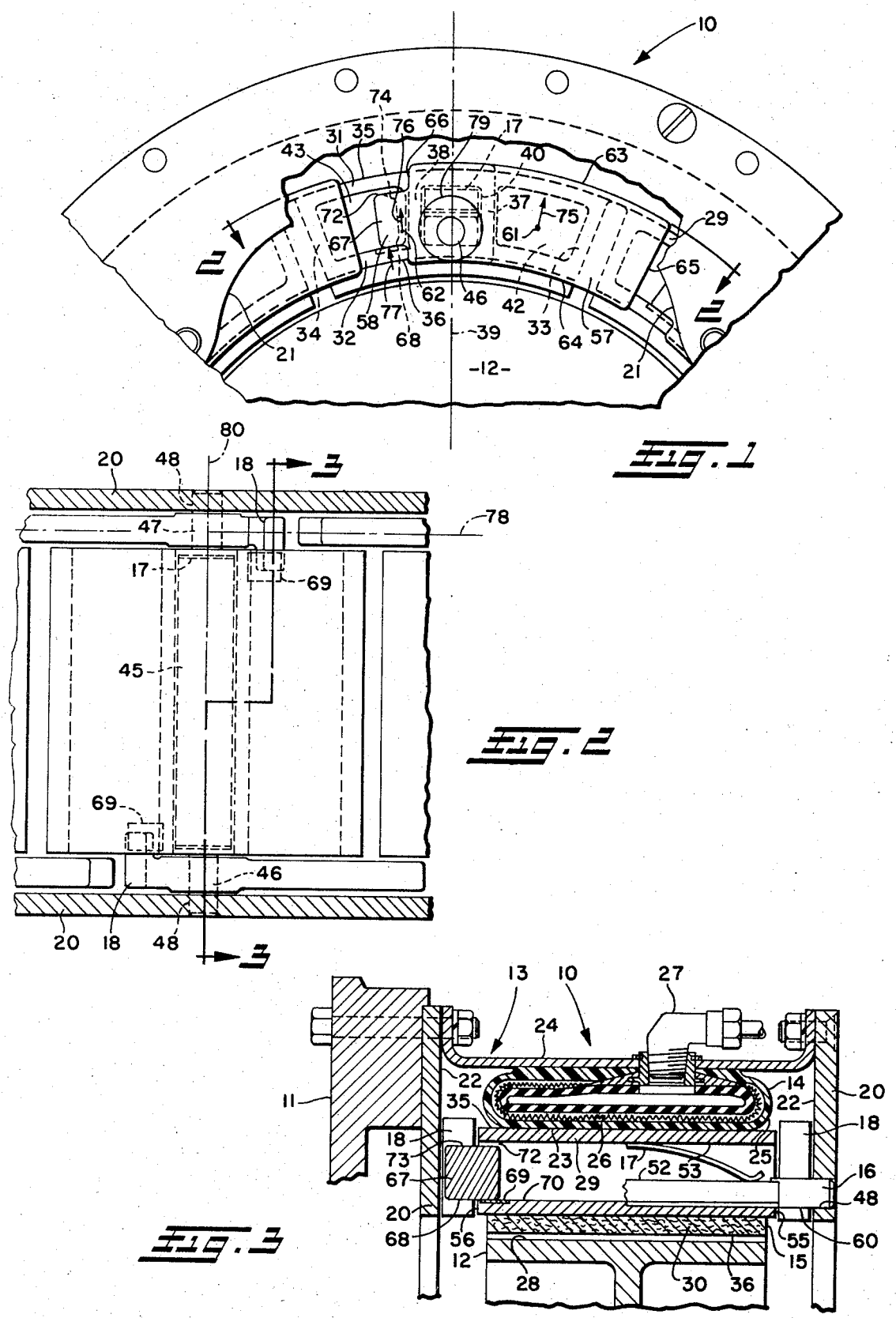

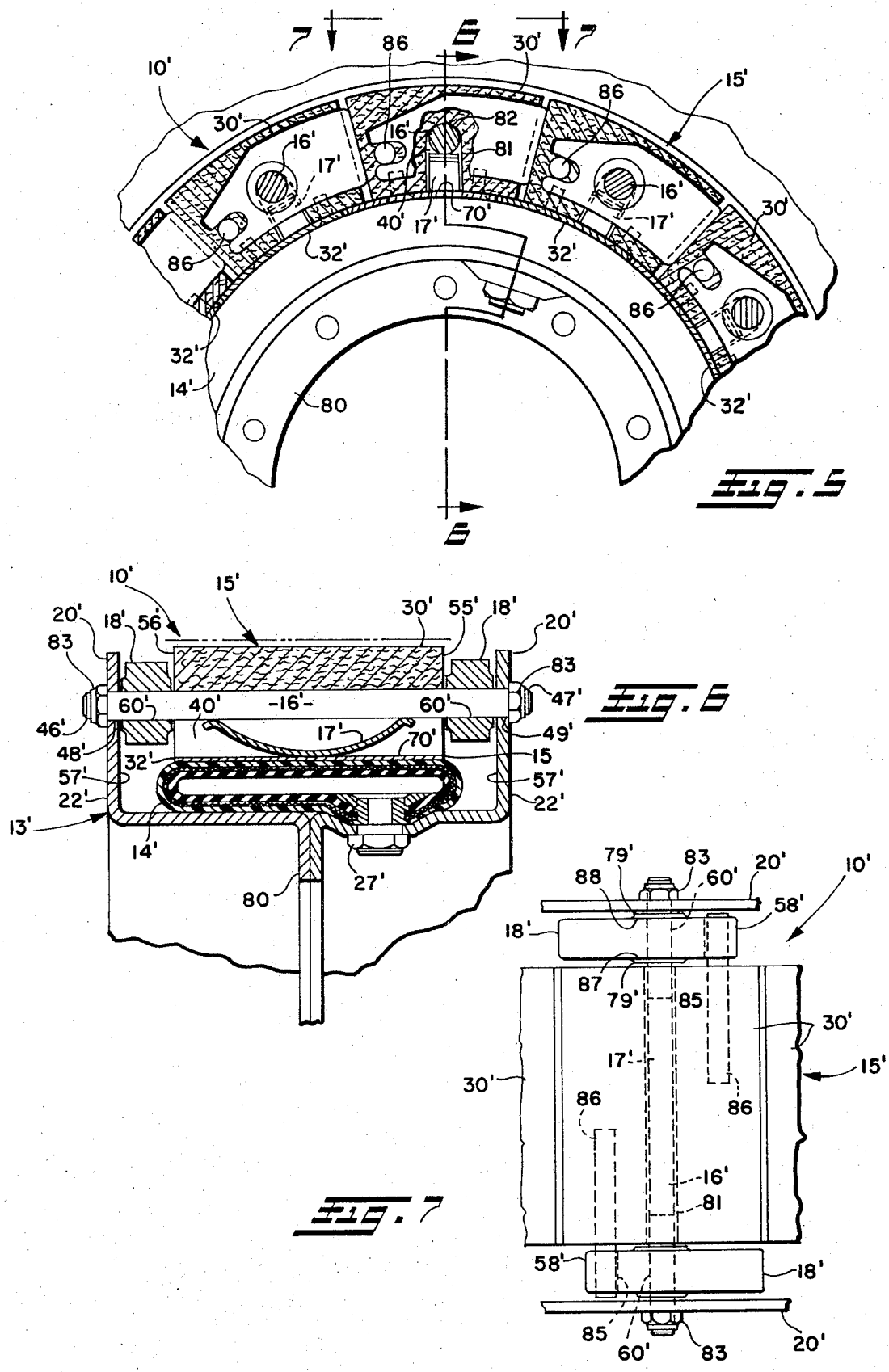

COUNTERWEIGHTED TORQUE TRANSMITTING MECHANISM

This invention relates to radially-engageable, torque transmitting mechanisms and more particularly to a counterweight arrangement employed therewith.

The invention is particularly applicable to torque transmitting mechanisms of the fluid-actuated type and will be described with particular reference to fluid-actuated couplings which operate by radial expansion of the inner member's or radial contraction of the outer member's drive engaging surfaces. However it will be appreciated that the invention may have broader applications and can be applied to any torque transmitting coupling which requires radial movement of a rotating surface to effect coupling with another member.

Fluid-actuated clutches which are known in the art and are generally very well suited for most applications comprise an annular frame of substantially U-shaped cross section, an inflatable tube at the bottom of the U, and a plurality of segmented, arcuate shoe assemblies within the frame which are radially movable by inflation of the tube. Heretofore rotation of the prior art clutches prior to and during engagement of the driven member has resulted in centrifugal forces developed by the shoe assembly and a portion of the tube which adversely effected clutch performance.

In clutches of the contracting type, centrifugal forces exerted by the clutch assembly against the tube during relatively high operating speeds which occur in certain extremely severe applications require a high amount of pressure to be supplied to the tube to overcome the centrifugal forces before movement of the shoes occurs. In such extreme, high speed applications high operating pressures may increase the cost of the clutch application in that high pressure equipment, such as a heavy-duty compressor and air lines are required. Additionally response time of the clutch in severe, extremely high speeds may lag as the compressor must supply additional pressure to the tube. Importantly, high pressure creates high stress in the frame which limits the maximum pressure of the tube and correspondingly results in a lower operating speed of the clutch than what otherwise might be obtained.

In clutches of the expanding type, heavy-duty spring arrangements must be employed in the clutch assembly to prevent premature radial expansion of the clutch shoes as a result of centrifugal force. Size limitations within the clutch limit the spring arrangements that can be employed therein and restrict expanding type clutches to relatively slow speed operation. Importantly, if an adequate high force spring arrangement could be applied to such a clutch, the pressure required to operate same at low speeds would be excessive. Furthermore, at high speeds, the centrifugual force of the arrangement may maintain the driving and driven members in frictional engagement with one another even though air pressure be released from the inflatable tube in an attempt to disengage the clutch.

It is thus an object of the subject invention to provide a counterweight arrangement for a radially-engageable torque transmitting mechanism which results in a mechanism operable over a wider coupling range and particularly at higher coupling speeds than heretofore possible.

In accordance with the invention, this object is achieved by providing a counterweight arrangement in a known fluid-actuated clutch of either the radially-expanding or contracting type. More particularly the clutch comprises an annular frame of U-shaped cross section defined by parallel circular side plates secured together at their ends by an annular rim. Secured to the rim is an inflatable annular tube which also abuts a plurality of segmented arcuate friction shoe assemblies. Each shoe assembly is affixed to the frame by a torque bar pinned to the side plates and extending through a central opening in the shoe. A spring compressed between the base wall of the central opening and the torque bar maintains the shoe assembly in proper position while permitting radial movement of the shoe assembly upon inflation of the tube. Inbetween each axial end face of the shoe and respective side plate is a counterweight pivotable about the torque bar. Each counterweight is sized to provide a greater mass extending on one side of its pivot than on the other side and the side of the counterweight of less mass is configured to contact the shoe at a predetermined distance from the shoe assembly's centerline. Rotation of the clutch tends to pivot the counterweight about the torque bar to provide a mechanical force advantage against the shoe which resists the centrifugal force of the clutch assembly. Because each counterweight is orientated to extend in an opposite direction from the weight on the opposite shoe side, the counterweight force exerted on each shoe is balanced.

In accordance with another aspect of the invention, the tolerances and geometry of the weights are such that any tendency of the counterweights to skew during operation and gouge the side plates or shoe assembly thus retarding the efficiency of the conterweights and cause undue wear is restricted.

Thus it is another object of the invention to provide a counterweight arrangemnt in a radially-engageable torque transmitting mechanism which exerts an essentially normal, radial force to balance the undesired effects of centrifugal force.

It is another object of the invention to provide an improved torque-engaging mechanism which is more compact and efficient than that of the prior art and which can be produced at a relatively low cost.

It is a further object of the invention to provide a radially-actuated counterweight arrangement which is easily applied to known radially-actuated clutches without significant change in design thereto.

It is a further object of the present invention to utilize the counterweight arrangement as a centering device for the shoe assemblies to prevent the shoe assemblies from wearing engagement with the annular frame.

The invention may take physical form in certain parts and arrangement of parts, a preferred embodiment of which will be described in detail herein and illustrated in the accompanying drawings which form a part hereof and wherein:

FIG. 1 is a side elevation view, partly broken away, of a fluid-actuated clutch of the contracting type employing the subject invention therein;

FIG. 2 is a top elevation view in section taken along Line 2—2 of FIG. 1;

FIG. 3 is a sectional view taken along Line 3—3 of FIG. 2;

FIG. 5 is a side elevation view in section of a fluid-actuated clutch of the expanding type equipped with the counterbalance arrangement of the subject invention;

FIG. 6 is a sectional view of the expanding clutch taken along Line 6—6 of FIG. 5; and FIG. 7 is a top elevation view taken along Line 7—7 of FIG. 5.

Figure 4:
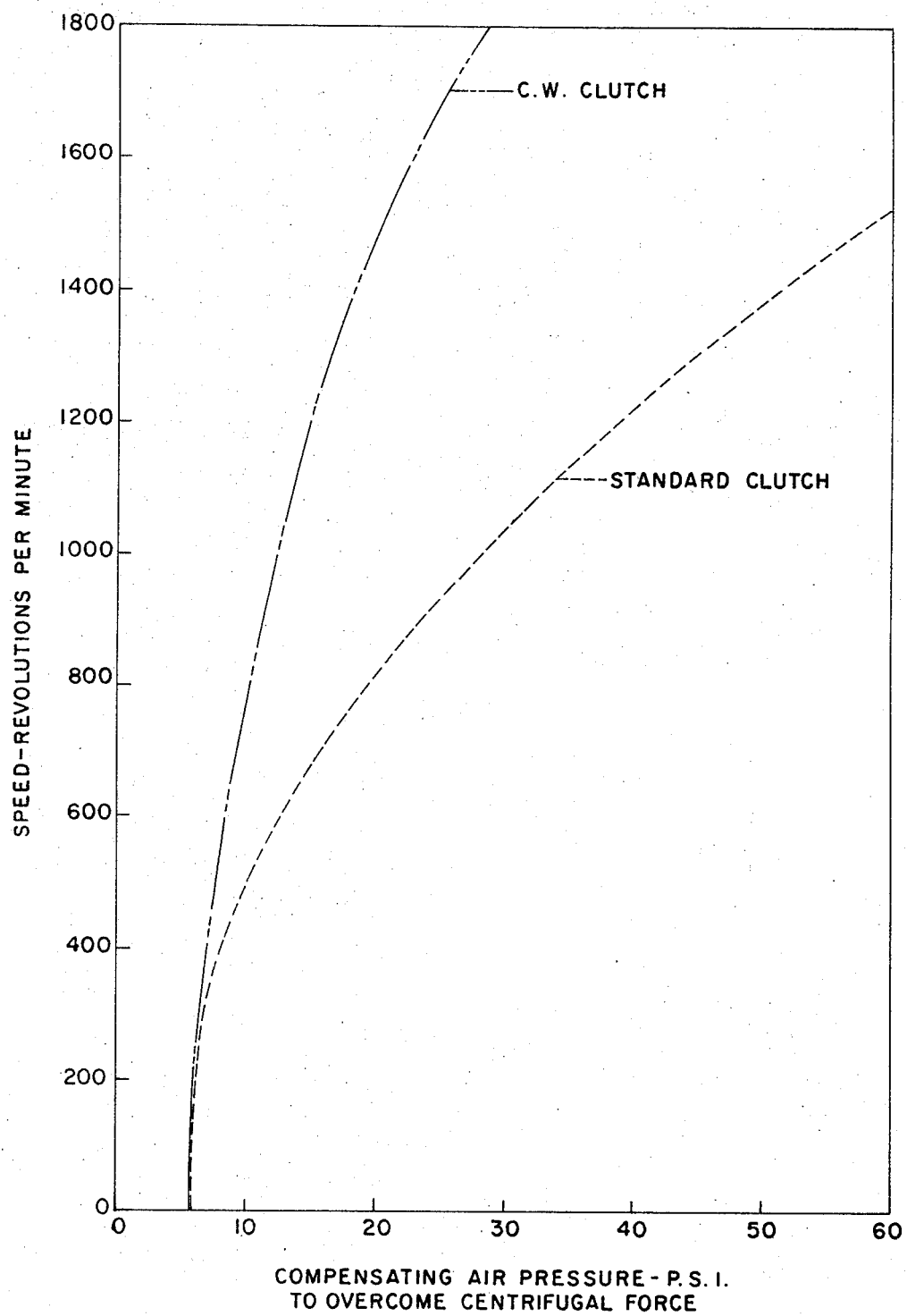
FIG. 4 is a graph of the pressure required to actuate a fluid-actuated device when equipped with and without the counterweight arrangement of the subject invention.

Referring now to the drawings wherein the showings are for the purpose of illustrating a preferred embodiment of the invention only and not for the purpose of limiting the same, FIGS. 1 and 3 show a radially-contacting, fluid-actuated clutch 10 having a driven input member 11 adapted to couplingly engage a driven output member shown as a drum 12 or the like. The use of the term "clutch" is intended as a descriptive term and not a limiting one and includes those devices known as "brakes" wherein the "output" member is fixed from rotation. Clutch 10 generally comprises annular frame assembly 13 of U-shaped configuration which receives an inflatable tube 14 at the base thereof and a plurality of segmented, arcuate friction shoe assemblies 15 adapted to be in contact with inflatable tube 14. A torque bar 16 and leaf spring 17 maintains each friction shoe 15 in abutting engagement with inflatable tube 14 and spaced a predetermined distance from drum 12. Within frame assembly 13 and positioned at each side of each friction shoe assembly 15 is an especially configured counterweight 18 which is pivotable about torque bar 16.

Frame assembly 13 includes a pair of rigid, axially-spaced, annular side plate members 20, secured together at their outer ends to a U-shaped ring or rim member 24 by bolts circumferentially-spaced thereabout (FIG. 3). The radial inner edges 21 of both side plates 20 are shown in FIG. 1 as scalloped to afford ventilation or cooling to the friction shoe assemblies 15. Secured as by bolts to the outer edge of one of the side plates 20 is the input member 11 which rotates contracting clutch 10 about its center by suitable means not shown.

Secured to the rim 24 is a clutch actuating mechanism which is shown in FIG. 3 to be a known inflatable tube 14 or more particularly described as a fluid-distensible, resilient, annular diaphragm. Other known actuating means such as a magnetic arrangement, or other known fluid-actuated mechanisms may be substituted for tube 14. In the embodiment shown, tube 14 preferably comprises a hollow elastomeric annulus 25 of rubber-like material and the hollow portion of the annulus is filled with several layers of cord-like material 26 similar to plies in a tire; the cord layers 26 and elastomeric annulus 25 being vulcanized together. Alternatively, other materials such as fiberglass, steel springs, nylon, etc. could be substituted for cord layers 26 as is well known in the art. A fluid inlet-outlet fitting 27 communicates with the interior of inflatable tube 14. When fluid, preferably air, under pressure is introduced through fitting 27 into the interior, tube 14 becomes radially-distended inwardly.

The segmented arcuate friction shoe assemblies 15 are disposed radially between an inner circumferential wall 23 of tube 14 and outwardly-facing, frictional engagement surface 28 of the driven drum 12. The shoe assemblies are disposed in succession circumferentially around the drum and comprise a shoe casting or block 29 to which a facing 30 of friction material is secured.

Shoe block 29 has an outer configuration defined by axially-extending, contiguous wall surfaces including a radially-outward circumferentially extending wall 31, a radially-inner circumferentially extending wall hereafter referred to as a backing plate 32 and radially-extending sidewalls 33, 34 (FIG. 1). An outer surface 35 of outer wall 31 is adapted to be in contact with the inner circumferential wall 23 of tube 14 and an inner surface 36 of backing plate 32 has the arcuately-extending friction facing riveted or bonded thereto in confronting relationship to the frictional engagement surface 28 of drum 12. A pair of interior walls 37, 38 extending between and contiguous with backing plate 32 and outer wall 31 and spaced equidistant from centerline 39 of friction block 29, defines a rectangular central opening 40 extending axially through shoe block 29. Interior walls 37,38, backing plate 32 outer and sidewalls 31,32,33,34 in turn define a pair of axially-extending trapezoidal openings 42,43; each opening 42,43 being disposed on one side of the rectangular opening 40. Trapezoidal openings 42,43 are adapted to coact with the scalloped edge 21 of both side plates 20, to provide ventilating means for the friction shoe assemblies 15.

Extending through the rectangular central opening 40 of each friction shoe 29 is torque bar 16 of high strength alloyed steel (FIGS. 2 and 3). A plurality of torque bars 16 are thus disposed at equal radial distances from the axis of the clutch 10 and drum 12 and are spaced apart at equal intervals arcuately around the axis of the clutch. Each torque bar 16 is defined as having a middle portion 45 of oblong rectangular cross-section configuration which extends the axial length of the friction shoe block 29 and includes end portions 46,47 extending from the middle portion 45. End portions 46, 47 are defined as circular bosses, each of which is snugly received in a corresponding hole 48, in each side plate 20. In this manner each torque bar 16 is rigidly supported by both end plates.

Interposed between the top surface 52 of the middle portion 45 of the torque bar and the bottom surface 53 of the outer wall 31 of the shoe block is bowed leaf spring 17 which exerts a biasing force on the friction shoe assembly 15 to maintain the shoe assembly at a fixed distance from the frictional face 28 of drum 12 when clutch 10 is unactuated. The leaf spring 17 is designed to have a length which does not extend beyond the axial length of friction shoe 29 when compressed and means such as grooves or notches (not shown) may be provided in either of surfaces 52,53 to maintain the leaf in a centered position if desired.

Between axial end faces 55,56 of the shoe block 29 and the interior surface 22 of each side plate 20 is positioned a counterweight 18; there being two counterweights for each shoe with each counterweight extending in an opposite direction from the other. Each counterweight is pivotable about the torque bar 16 by a hole 60 therein which receives one of the end portions 46,47 of the torque bar. The counterweight may assume any type of configuration so long as it exerts leverage from its forward end 57 (defined as the mass of the forward end acting through its center of gravity 61) about the weight's pivot point which is greater than the leverage about the pivot from its rearward end 58 (defined as the mass of the rearward end acting through its center of gravity 62) to thus produce a "balancing moment" on the shoe assembly 15.

In the embodiment shown, each counterweight 18 has a configuration somewhat similar to the shoe block 29 and is defined by a radially-outer circumferential surface 63, a radially-inner circumferential surface 64 and a forward side surface 65. The cross bar hole 60 is positioned remote from the forward side surface 65 and adjacent a rearward side surface 66 which blends into a laterally extending projection or finger 67. In an assembled position, finger 67 extends within one of the trapezoidal openings 42,43 in shoe block 29 wherein the bottom surface 68 of the finger contacts a wear plate 69 recessed in the top surface 70 of backing plate 32 when clutch 10 is rotated. In the counterweight position shown in the drawings which represents a rotating unactuated position of the clutch, a clearance 72 as shown may exist between the top surface 73 of the finger and the bottom surface 53 of the radially outer wall 31 of the shoe block. However clearance 72 is not necessary if the inner edge surface 74 of the finger top surface 73 is chamfered as shown to provide a sufficient angle to permit angular displacement of finger 67 when shoe block 29 is displaced. The finger 67 may interact with the friction shoe assembly 15 such as by interdigitating projections or the like to prevent axial movement of the shoes relative to the frame and thus prevent undue side wear of the shoes.

When a contracting clutch, not equipped with the counterweight arrangement of the subject invention, is rotating in an unactuated or uncoupled position, the friction shoe assembly 15 will exert a centrifugal force which will be resisted by the torque bar 45. Additionally the distensible portion of the tube 14 by virtue of its mass will exert a centrifugal force on the undistensible portion of the tube. When the clutch is desired to be actuated, the inflatable tube must first develop sufficient pressure to overcome the centrifugal force of the distensible portion of the tube and also the centrifugal force of the friction shoe assembly 15 before the shoe assembly 15 can be radially displaced. When the clutch is equipped with counterweights 18 of the present invention, each counterweight will tend to pivot about the torque bar camming the finger projection 67 against its respective wear plate 69 to counteract the centrifugal force in the friction shoe assembly 15. That each counterweight 18 will react in such a manner is easily demonstrated by considering the forces acting on the counterweight as shown in FIG. 1. Thus a centrifugal force or "moment arm" 75 acting through the center of gravity 61 at the larger forward mass section 57 of the counterweights is greater than and displaced at a further distance from the pivot point of the counterweight than the centrifugal force or "moment arm" 76 acting through the center of gravity 62 at the smaller rearward end 58 of the counterweight. Summing moments (i.e., mass moments of inertia for the forward and rearward ends respectively) about the pivot point of the counterweight indicates that a significant reaction force 77 will be exerted on the finger projection 67 of the counterweight to maintain the counterweight in equilibrium. Test results have indicated that when the counterweights are designed to compensate for approximately 90–95 percent weight of the friction shoe assembly approximatey 60–65 percent or more of the centrifugal loss in the clutch arrangement will be compensated by the counterweights. Importantly, the air pressure required to compensate for centrifugal losses which is directly proportional to the square of the rotating velocity of the clutch, results in a significant percentage of improvement for high rotating speeds as shown in the graph of FIG. 4. The graph in FIG. 4 illustrates an optimum design for a contracting clutch in that if the counterweights be increased to compensate more than the weight of the friction shoe assembly, such design may actuate the clutch prematurely at a certain speed by the affect of the counterweights themselves.

When the clutch is actuated, the friction shoe assembly 15 will move radially-inwardly to drivingly engage the drum 12. As the shoe assembly moves, the counterweight will further pivot to maintain the balancing force exerted by the finger projection 67 on the wear plate 69. To maintain this force normal to the plate during camming action of the counterweights and thus prevent any force moments from developing which tend to rotate the shoe assembly 15 about the torque bar 16, the bottom surface 68 of the finger projection is constructed along a predetermined arcuate surface. Thus the counterweight forces exerted on the friction shoe assembly 15 always remain essentially normal to the shoe block 29 and the shoe assembly is balanced because the counterweight forces from opposing counterweights are offset equal distances in opposite directions from shoe centerline 80.

Because reaction force 77 is offset from the counterweight centerline 78 in the embodiment shown, there is a tendency for the counterweight to skew and bear at its forward end 57 in point contact with the shallow portion of the scalloped edge 21 of the side plate 20. To overcome this tendency, the tolerances between boss ends 46,47 of the torque bar and crossbar holes 60 have been sized closed. To further prevent any concentrated loading from the counterweight on a shallow portion of the scalloped edge 21, a boss 79 is formed around the hole portion of the counterweight adjacent the interior surface 22 of the side plates 20 so that a uniform load is exerted on the bottom portion of scalloped side plate.

The counterweight arrangement of the subject invention is also applicable to fluid-actuated clutches of the radially-expanding type and such an application is shown in FIGS. 5, 6 and 7. The expanding clutch shown is somewhat similar to that of the contracting clutch and like numbers designated by a prime (') indicate like structures where applicable.

The contracting clutch 10' thus shown includes two circular, Z-shaped side plates 20' bolted together to define an annular U-shaped frame 13' and an annular hub portion 80 depending from the bottom of the U to which is secured a driving input member (not shown). An inflatable tube 14' is affixed to the bottom of frame 13' and an inlet-outlet fitting 27' extends through the frame into the tube whereby fluid, preferably air under pressure, will cause tube 14' to be distended radially-outwardly. Positioned within the U-shaped frame 13' between the outer circumferential wall of tube 14' and the inner, frictionally-engaging cylindrical surface of a hollow driven drum (not shown) are a plurality of segmented, arcuate friction shoe assemblies 15'.

Each friction shoe assembly 15' comprises an arcuate backing plate 32' and a segmented ring of facing material 30' riveted to the backing plate 32'. A central opening 40' extends axially through the facing 30' and is defined by two axially-extending, spaced wall surfaces 81 which curve together at the apex of the opening to define a cylindrical surface 82. A cylindrical torque bar 16' is received within cylindrical surface 82 and has threaded ends 46',47' passing through corresponding holes 48' in both side plates 20' which snugly receive the torque bar. Nuts 83 are torqued to the threaded ends of bar 16' to maintain the rigidity of U-shaped frame 13'. A leaf spring 17' within opening 40' and between the outer surface 70' of backing plate 32' and the torque bar 16' is precompressed or bowed to maintain friction shoe assembly 15' in its proper position. Heretofore, this leaf spring had to be excessively strong because it maintained friction shoe assemblies 15' in an unactuated position when clutch 10' was rotating.

Between each axial end face 55',56' of each shoe assembly 15' and the interior surface 22' of each sidewall is a counterweight 18'; there being two counterweights for each shoe assembly which extend in opposite directions from one another. A hole 60' extending through the counterweight secures the counterweight 18' in a pivotable manner to the torque bar 16'. The counterweight 18' is similar in configuration to the counterweight 18 for the contracting clutch 10 with the exception of its rearward end 58' which is slotted as at 85 to receive a reaction force pin 86 which is embedded in friction facing 30'. Thus the reaction force exerted by pin 86 on counterweight 18' is in alignment with the counterweight axis in contradistinction to that in the contracting clutch previously described and results in a balanced load on the counterweight. Nevertheless, bosses 79' are formed in the inner and outer edge surfaces 87,88 surrounding the counterweight hole 60' and the tolerances between torque bar and counterweight hole are sized close to prevent the forward end of the torque bar from gouging the axial end face of the shoe assembly or the side plates in the event that the counterweight has a tendency to skew.

When clutch 10' is rotating in an unactuated position, the centrifugal force on the counterweight is transmitted via mechanical leverage to reaction force pins 86. Thus a balanced force is exerted on the shoe assembly to oppose the inherent centrifugal force of the shoe assembly 15' and distensible portion of tube 14' exerted against leaf spring 17' and maintain shoe assemblies 15' in their unactuated position. In this embodiment, the weights are sized to produce a reactionary force which compensates for a weight greater than that of the shoe assemblies 15' to prevent premature actuation of the clutch which is in contradistinction to the sizing of the weights in the contracting clutch arrangement. When clutch 10' is actuated, the counterweight force continues to balance the centrifugal force of the clutch assembly as the weight pivots about the torque bar 16' by virtue of the camming action between slot 85 and pin 86.

It is apparent that many modifications may be incorporated into the counterweight arrangement of the subject invention without departing from the spirit or essence of the invention. It is our intention to include all such modifications insofar as they come within the scope of the appended claims.

It is thus the essence of our invention to provide a counterweight arrangement applying an effective balancing force to torque engaging mechanism employing radial movement of engaging surfaces to effect driving engagement with a driven member.

Having thus defined our invention, We claim:

1. A torque transmitting device for coupling relatively rotatable first and second assemblies to one another, said device including a first assembly having a relatively rotatable frame; said frame being generally cylindrical and U-shaped in cross sectional configuration, said frame including first and second circular side plates and an annular rim secured therebetween, coupling means disposed for radial movement with respect to said frame for engaging said second relatively rotatable assembly, said coupling means including a plurality of shoe assemblies circumferentially spaced in equal increments around said frame, each shoe assembly being defined as an arcuately-extended segmented shoe block and a facing of friction material is secured to said shoe block, each assembly further having a central opening axially extending therethrough, actuating means engaging said coupling means to cause said radial movement thereof and a counterweight arrangement for said device, said counterweight arrangement comprising:

mounting means affixed to said frame, said mounting means including a torque bar extending through said opening and secured at its ends to the sides of said frame;

a first and a second counterweight pivotable about said mounting means and configured to define a forward end extending on one side of said mounting means and a rearward end extending on the opposite side of said mounting means, said forward ends exerting greater leverage about said mounting means than said rearward ends when said first assembly is rotating, said first counterweight having its forward end extending in a direction opposite said forward end of said second counterweight, each counterweight having an opening axially extending therethrough to receive said torque bar whereby each counterweight is positioned between an axial end face of said shoe assembly and the interior surface of one of said side plates; and force transmitting means affixed to said coupling means and operatively engaged with said rearward end of said counterweight to exert said leverage on said coupling means whereby said counterweight exerts a force tending to counteract the undesirable effects of centrifugal force exerted by said coupling means.

2. The arrangement of claim 1 wherein said force transmitting means interact with said shoe blocks to substantially prevent axially movement of said shoe assemblies relative to said frame.

3. The arrangement of claim 2 wherein said force transmitting means and said shoe blocks interact by means of interdigitating projections.

4. The arrangement of claim 1 wherein
said frame opens inwardly,
said actuating means includes a fluid distensible, annular tube between said rim and said shoe block inflatable to bias each shoe assembly radially inwardly,
said mounting means further including spring means within said central opening biasing said shoe block against said torque bar, said shoe block having first and second axially-extending openings disposed on each side of said central opening, and said force transmitting means further including a lateral projection extending from said rearward end into one of said first and second openings.

5. The arrangement of claim 1 wherein said frame opens outwardly, said actuating means includes a fluid distensible, annular tube between said rim and shoe block, inflatable to bias each shoe assembly radially outwardly into frictional contact with said driven member, said mounting means further including spring means within said central opening biasing said shoe block against said torque bar, and said force transmitting means further includes a pin extending from each axial end face of said shoe assembly and a slot at the rearward end of each counterweight receiving said pin, each pin at each end face being an equal distance from said central opening.

6. A fluid-actuated, torque transmitting device comprising two relatively rotatable structures adapted to be in selective torque-sustaining frictional engagement with each other and arranged one inside the other, the outer of said structures comprising:

a relatively rotatable frame; said frame including a pair of circular, parallel side plates secured at their outer ends to an annular rim;

an inflatable annular tube within said frame;

a plurality of arcuate, segmented shoe assemblies movable radially-inwardly into engagement with said inner structure upon inflation of said tube, said shoe assemblies comprising a shoe block having a central opening extending axially therethrough, a first axially-extending opening disposed on one side of said central opening, a second axially-extending opening disposed on the other side of said shoe and an arcuate facing of friction material secured to the bottom of said block;

bar means affixed to said frame for securing said shoe assemblies for movement with respect to said frame, said bar means includes a torque bar for each shoe assembly secured to said side plates and extending through said central opening and a spring within said opening biasing said shoe assembly outwardly against said torque bar; and counterweight means secured to and pivotable about said bar means to exert a radially-inwardly force to said shoe assemblies upon rotation of said frame, said counterweight means including a counterweight positioned between each axial end face of each shoe block and the inner surface of each side plate to define two counterweights for each friction shoe assembly, each counterweight having an aperture therein receiving said torque bar for pivotable movement thereabout, a first portion of given mass on one side of said aperture and a second portion on the other side of said aperture of mass greater than said first potion, a laterally-extending projection from the second portion extending into one of said first and second openings and adapted to cammingly engage said shoe block upon rotation of said frame, both counterweights in each shoe assembly orientated to extend in opposite directions from each other, said projection for one of said counterweights extending into said first opening and said projection for the other counterweight extending into said second opening at equal distances from the axial centerline of said shoe assembly.

7. The device of claim 6 wherein said shoe block is a casting having a radially inner circumferentially extending wall, a radially outer circumferentially extending wall and contiguous sidewalls between said inner and outer walls, and said lateral projection having an arcuate bottom arcuate surface maintaining said surface normal to said radially inner wall when and as said shoe block moves radially-inwardly upon inflation of said tube as said frame rotates.

8. The device of claim 6 wherein the bottom portion of each side plate is scalloped in sinusoidal curve form, the lowermost portions of said curves for both plates adjacent said central opening and the uppermost portions of said curves adjacent said first and second openings to provide ventilation therethrough, said second portion of said counterweight sized to extend less than the distance of said first and second openings.

9. The device of claim 8 wherein a boss is formed on the side of each counterweight adjacent a side plate, a first tolerance is defined between the axial length of said counterweight of said boss portion and the space between said axial end of said shoe assembly and the interior surface of said lowermost portion of said side plates, a second tolerance is defined between said aperture in said counterweight and said torque bar extending therethrough, a third tolerance is defined between the axial length of said counterweight at said forward end and the space between said axial end face of said shoe assembly and the interior surface of said uppermost portion of said side plate, and said second tolerance being less than said first tolerance and said first tolerance being less than said third tolerance to prevent said counterweight from bearing against the uppermost portion of said plate during pivotal movement.

10. A fluid-actuated torque transmitting device comprising two relatively rotatable structures adapted to be in torque sustaining frictional engagement with each other and arranged one inside the other, the inner one of said structures comprising:

a relatively rotatable frame; said frame including a pair of circular, parallel side plate portions and an annular rim portion secured to said side plate portions at their outer ends;

an inflatable annular tube within said frame;

a plurality of arcuate, segmented shoe assemblies movable radially outwardly into engagement with the outer structure upon inflation of said tube, said shoe assemblies including a segmented, arcuate backing plate and a segmented, arcuate facing of friction material secured to the outer surface of said backing plate, said friction material having a central opening extending therethrough;

bar means affixed to said frame for securing said shoe assemblies for said radial movement with respect to said frame, said bar means including a torque bar for each shoe assembly secured to said side plates and extending through said central opening and a spring within said opening biasing said shoe assembly inwardly against said torque bar; and counterweight means secured to and pivotable about said bar means to exert a radially-inwardly force to said shoe assemblies upon rotation of said frame, said counterweight means including a first force receiving member extending from an axial end face of said facing, a second force receiving member extending from the opposite axial end face of said facing, each force receiving member spaced laterally in opposite directions from each other at equal distance from the axial centerline of said shoe assembly, and a counterweight positioned between each axial end face of each shoe assembly and the inner surface of each side plate portion to define two counterweights for each shoe assembly;

each counterweight having an aperture therein receiving said torque bar for pivotable movement thereabout, a first portion of given mass on one side of said aperture and a second portion on the other side of said aperture of mass greater than said first portion, a groove within the rearward portion of said counterweight and adapted to cammingly engage said force member upon rotation of said frame; and both counterweights in each shoe assembly orientated to extend in opposite directions from each other, said groove in one of said counterweights receiving said first force member and said groove in the other counterweight receiving said second force member.

* * * * *

PO-1050
(5/69)

UNITED STATES PATENT OFFICE
CERTIFICATE OF CORRECTION

Patent No. 3,856,124   Dated   12/24/74

Inventor(s) Raymond E. Mack; Kiritkumar R. Patel; Edward C. Crist

It is certified that error appears in the above-identified patent and that said Letters Patent are hereby corrected as shown below:

Col. 9, line 60:   "potion" should read ---portion---.

Col. 10, line 44:  before "plate" insert -- side --.

Signed and sealed this 10th day of June 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,856,124
DATED : December 24, 1974
INVENTOR(S) : Raymond E. Mack; Kiritkumar R. Patel; and Edward C. Crist It is certified that error appears in the above—identified patent and that said Letters Patent are hereby corrected as shown below:

In Item 75 it states: "both of Brooklyn, all of N.Y."
This is incorrect, it should read all of OHIO.

Signed and Sealed this twenty-third Day of December 1975

[SEAL]

Attest:

RUTH C. MASON
*Attesting Officer*

C. MARSHALL DANN
*Commissioner of Patents and Trademarks*